(12) United States Patent
Nakamura et al.

(10) Patent No.: US 6,271,296 B1
(45) Date of Patent: Aug. 7, 2001

(54) SOLID GOLF BALL

(75) Inventors: Atsushi Nakamura; Hisashi Yamagishi; Takashi Maruko; Yutaka Masutani, all of Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/466,833

(22) Filed: Dec. 20, 1999

(30) Foreign Application Priority Data

Jul. 9, 1999 (JP) .................................................. 11-195816

(51) Int. Cl.$^7$ ............................. A63B 37/00; A63B 37/06
(52) U.S. Cl. ........................ 524/423; 473/373; 473/374; 473/376
(58) Field of Search ..................................... 473/373, 374, 473/376; 524/423

(56) References Cited

U.S. PATENT DOCUMENTS 5,779,562 * 7/1998 Melvin .
6,071,201 * 6/2000 Maruko .

* cited by examiner

*Primary Examiner*—David J. Buttner
(74) *Attorney, Agent, or Firm*—Sughrue, Mion, Zinn, Macpeak & Seas, PLLC

(57) ABSTRACT

In a solid golf ball of four or multilayer structure comprising a core, an enclosing layer, an intermediate layer, and a cover, the core is comprised primarily of a thermoplastic resin or thermoplastic elastomer and has a diameter of 3–18 mm and a Shore D hardness of 15–50, the enclosing layer is comprised primarily of a thermoplastic resin or thermoplastic elastomer, and the enclosing layer and the intermediate layer have a substantially equal Shore D hardness at a boundary therebetween. The golf ball offers pleasant feel when hit, improved durability, and increased distance.

4 Claims, 1 Drawing Sheet

SOLID GOLF BALL

BACKGROUND OF THE INVENTION

1. Field of the Invention

The present invention relates to a golf ball of four or multilayer structure offering pleasant feel when hit, improved durability, and increased distance.

2. Prior Art

A variety of multi-piece golf balls including three-piece and four-piece ball constructions have been developed over the past few years in order to improve ball performance. The practice is known of balancing a soft feel with good resilience in multi-piece golf balls by giving the ball a hardness distribution across its respective layers (core, intermediate layer and cover) in such a way as to retain both properties. In particular, a number of patents have been described on techniques for softening the core in order to achieve a soft feel (see, for example, JP-B 4-55077, JP 2674627, and JP-A 7-194735).

The cores of the golf balls disclosed in these patents all have a diameter of about 30 mm, or at least about 20 mm. Softening the core significantly lowers its resilience, which must then be compensated for by increasing the hardness of the intermediate layer and cover, to provide a reasonable resilience for the ball as a whole. However, increasing the hardness of these layers gives the ball a poor feel. In addition, stress concentration due to differences in hardness arises at the interface between the soft core and the hard intermediate layer, causing the layers to separate. JP-A 11-417 discloses a core provided with an inner layer of relatively small diameter. Yet, here too, there exists a large difference in hardness between the inner layer and the intermediate layer that has been formed around and encloses the inner layer, resulting in interfacial adhesion problems such as interlayer separation, and poor durability due to rubber fissuring in the intermediate layer.

SUMMARY OF THE INVENTION

An object of the invention is to provide a solid golf ball of four or multilayer structure offering pleasant feel when hit, improved durability, and increased distance.

According to the invention, there is provided a solid golf ball of four or multilayer structure comprising a core, an enclosing layer around the core, an intermediate layer around the enclosing layer, and a cover around the intermediate layer. The core is comprised of a thermoplastic resin or thermoplastic elastomer as a base and has a diameter of 3 to 18 mm and a Shore D hardness of 15 to 50. The enclosing layer is comprised of a thermoplastic resin or thermoplastic elastomer as a base. The enclosing layer and the intermediate layer have a substantially equal Shore D hardness at a boundary therebetween.

The intermediate layer may be formed of a rubber composition comprising polybutadiene as a base. Preferably, the Shore D hardness of the core is lower than that of the intermediate layer. The core may have a specific gravity of at least 1.10.

The invention is directed to a solid golf ball of multilayer structure comprising at least four layers: a core, an enclosing layer, an intermediate layer, and a cover. It has been found that when the core is formed primarily of a thermoplastic resin or thermoplastic elastomer to a diameter of 3 to 18 mm and a Shore D hardness of 15 to 50, the enclosing layer is formed primarily of a thermoplastic resin or thermoplastic elastomer, and the enclosing layer and the intermediate layer have a substantially equal Shore D hardness at a boundary therebetween, the golf ball becomes durable against strikes and offers pleasant feel and travels good distance when hit.

As opposed to the conventional use of rubber compositions such as polybutadiene as the core material, the invention selects a resinous material and a small diameter for the core. Using a resin material in the core greatly facilitates the grinding step, making it possible to efficiently produce small-diameter cores. Moreover, the decline in the resilience due to the use of a resin material in the core is relatively small for the ball as a whole because of the small diameter of the core. The problem of interfacial separation is substantially eliminated since the enclosing layer and the intermediate layer are substantially equal in hardness.

BRIEF DESCRIPTION OF THE DRAWING

The objects, features and advantages of the invention will become more apparent from the following detailed description.

The only figure.

DETAILED DESCRIPTION OF THE INVENTION

Figure 1:
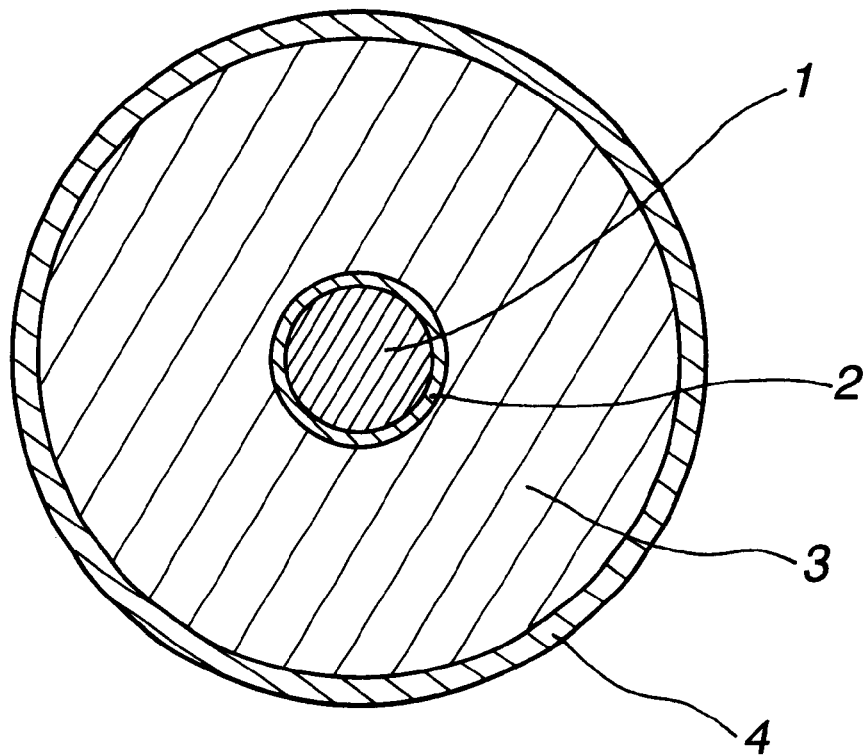
FIG. 1 is a sectional view showing a solid golf ball according to one embodiment of the invention.

Referring to FIG. 1, the solid golf ball according to one embodiment of the invention is illustrated as having a four-layer structure comprising a solid core 1, an enclosing layer 2 that encloses the core 1, an intermediate layer 3 that encloses the enclosing layer 2, and a cover 4 that encloses the intermediate layer 3. The core 1 has a small diameter as compared with prior art cores. Despite the small diameter of the core, quite unexpectedly, the golf ball of the invention is improved in durability, feel and distance. The golf ball of the invention is not limited to the four layer structure illustrated herein and may be constructed of more layers. For example, the cover, though illustrated as a single layer, may be formed to a multilayer structure of two, three or more layers.

As opposed to the prior art golf balls in which the core is formed of rubber compositions, the core in the golf ball of the invention is formed of a composition comprising a thermoplastic resin or thermoplastic elastomer as a base. Typical are ionomer resins, thermoplastic polyamide elastomers, and thermoplastic polyester elastomers. Some examples of highly suitable commercial products include Surlyn (ionomer resins manufactured by E. I. DuPont de Nemours and Co.), Himilan (ionomer resins manufactured by Dupont-Mitsui Polychemicals Co., Ltd.), Amilan (thermoplastic polyamide elastomers by Toray Industries, Inc.), Rilsan (thermoplastic polyamide elastomers manufactured by Dupont-Toray Co., Ltd.) and Hytrel (thermoplastic polyester elastomers manufactured by Dupont-Toray Co., Ltd.).

An inorganic filler such as barium sulfate, titanium dioxide or zinc oxide may be compounded in the resin composition for weight adjustment purposes. It is preferred to add the inorganic filler in an amount of not more than 40 parts by weight, and especially not more than 38 parts by weight, per 100 parts by weight of the base. Too much inorganic filler would lower the workability of the composition during core manufacture. The core may be formed by well-known techniques such as injection molding of a thermoplastic resin or elastomer base composition.

The core should have a diameter of at least 3 mm, preferably at least 3.5 mm, more preferably at least 4 mm, further preferably at least 5 mm, most preferably at least 8 mm and up to 18 mm, preferably up to 16 mm, more preferably up to 15 mm. A core with a too small diameter fails to exerts its effect. A core having too large a diameter would adversely affect the rebound characteristics of the golf ball or cause rubber cracking, failing to ensure durability.

Also the core should have a Shore D hardness of at least 15, preferably at least 18, more preferably at least 22, and most preferably at least 25. The upper limit of Shore D hardness is 50, and preferably 48. A core with a too low Shore D hardness leads to poor resilience whereas a core with a too high hardness gives a hard feel. The Shore D hardness referred to herein is measured according to ASTM D-2240.

Though not critical, the core preferably has a specific gravity of at least 1.10, and more preferably at least 1.11, with the upper limit being 1.60, and especially 1.50. A core with a too low specific gravity would sometimes require the intermediate layer having an increased specific gravity or detract from resilience whereas a core with a too high specific gravity would sometimes require to increase the amount of filler added, detracting from moldability.

The enclosing layer is formed so as to surround the core and must be composed primarily of a thermoplastic resin or thermoplastic elastomer. Use may be made of well-known thermoplastic resins and elastomers as exemplified above for the core material. Illustrative examples include ionomer resins, thermoplastic polyester elastomers and thermoplastic polyamide elastomers. Thermoplastic polyurethane elastomers are also useful. Some examples of suitable commercial products include Surlyn, Himilan and Hytrel mentioned above as well as Pandex (thermoplastic polyurethane elastomers manufactured by Dainippon Ink & Chemicals, Inc.). Like the preparation of the core, the enclosing layer may be formed by an injection molding method involving, for example, placing the preformed core in a mold and injection molding the resin or elastomer material into the mold cavity.

The enclosing layer typically has a thickness or gage of from 1.0 to 5.0 mm, preferably from 1.2 to 4.0 mm, and especially 1.4 to 3.0 mm. Too thin an enclosing layer would exert to a less extent the effect of mitigating stress concentration in the intermediate layer and allow rubber fissuring in the intermediate layer. If the enclosing layer is too thick, the intermediate layer must be made thin due to the structural balance of the uncovered ball (that is, the sphere consisting of core, enclosing layer and intermediate layer prior to formation of the cover), which would compromise resilience and moldability.

For the intermediate layer, a rubber composition is advantageously used because of the availability of resilience. Thermoplastic resins and thermoplastic elastomers are also useful. For example, ionomer resins, thermoplastic polyester elastomers and thermoplastic polyamide elastomers may be used.

When the intermediate layer is formed of rubber, a polybutadiene base rubber composition is preferred as in prior art golf ball cores. The use of cis-1,4-polybutadiene having a cis structure content of at least 40% is highly suitable. Where desired, other rubber components such as natural rubber, polyisoprene rubber or styrene-butadiene rubber may be compounded with polybutadiene as appropriate. The rebound characteristics of the golf ball can be improved by increasing the proportion of rubber components. The other components may be blended in an amount of up to about 10 parts by weight per 100 parts by weight of the polybutadiene.

A crosslinking agent may be blended in the rubber composition. Exemplary crosslinking agents are the zinc and magnesium salts of unsaturated fatty acids (e.g., zinc methacrylate, zinc acrylate), and ester compounds (e.g., trimethylpropane methacrylate). Zinc acrylate is especially preferred for imparting high resilience. The crosslinking agent is preferably blended in an amount of about 10 to 40 parts by weight per 100 parts by weight of the base rubber.

A vulcanizing agent can generally be compounded in the rubber composition. It is recommended that the vulcanizing agent include a peroxide, an example of which is Perhexa 3M commercially available from Nippon Oils and Fats Co., Ltd. The amount of peroxide blended is preferably set at from about 0.6 to 2 parts by weight per 100 parts by weight of the base rubber.

If necessary, antioxidants, and fillers such as zinc oxide or barium sulfate for adjusting the specific gravity may be blended in the rubber composition. The amount of such specific gravity modifiers is preferably from about 1 to 30 parts by weight per 100 parts by weight of the base rubber.

The intermediate layer may be produced from such a rubber composition by a known vulcanization and curing process. Use is preferably made of a two-step process in which the rubber composition is first subjected to primary vulcanization (semi-vulcanization) in a mold to form a pair of hemispherical cups. The core about which the enclosing layer has been formed is then placed in one of the hemispherical cups, the other cup is closed over this, and secondary vulcanization (full vulcanization) is carried out.

In the practice of the invention, the intermediate layer may be either a single layer or a multilayer structure of two or more layers. In the latter case, a first layer is formed of the above-described rubber composition and a second layer (and other layers if any) may be formed of a similar rubber composition or a resin base composition, and preferably the rubber composition. The intermediate layer is preferably formed to such a thickness that the solid core consisting of the core, enclosing layer and intermediate layer may have a diameter of 34.0 to 41.0 mm, and especially 34.5 to 40.0 mm.

The invention requires that the enclosing layer and the intermediate layer have a substantially equal hardness when the enclosing layer and the intermediate layer are respectively measured for Shore D hardness near the interface therebetween. The substantially equal hardness means that the difference (or permissible error) in Shore D hardness between the enclosing layer and the intermediate layer is within ±5 units (i.e., between −5 units and +5 units), preferably within ±4 units, and especially within ±3 units. A large hardness difference would allow stresses to concentrate at the interface between the enclosing layer and the intermediate layer, impairing durability and hence could not attain the objects of the invention. It is noted that the Shore D hardness of the intermediate layer is determined by cutting the ball in half, and making measurement on the smooth cross section of the hemisphere. The Shore D hardness of the enclosing layer is measured according to ASTM D-2240.

The Shore D hardness of the intermediate layer itself is typically at least 30, preferably at least 35 and up to 65, preferably up to 64, most preferably up to 62. It is recommended that the Shore D hardness of the intermediate layer be higher than the hardness of the core, that is, the core be made softer than the intermediate layer. If the intermediate layer has a lower Shore D hardness, there is a likelihood that the ball loses resilience. Although the difference in hardness between the intermediate layer and the core is not critical, a better feel is obtained when the core is softer than the intermediate layer.

The golf ball of the invention is formed by enclosing the intermediate layer-enclosed core with a cover. Known golf ball cover stock materials may be used, suitable examples of which include ionomer resins, polyurethane-, polyamide- and polyester-based thermoplastic elastomers, and balata rubber. Any well-known filler may be added thereto if necessary. A conventional injection molding or other suitable technique may be used to form the cover.

Preferably, the cover has a thickness or gage of 0.8 to 4.3 mm, more preferably 1.0 to 3.5 mm, further preferably 1.4 to 2.5 mm, and most preferably 1.5 to 2.3 mm. If the cover is given a multilayer structure, the plural layers should be adjusted to an overall thickness within the above-described range. Too thin a cover would fail to render the ball durable whereas a too thick cover would impair the feel.

Typically the cover has a Shore D hardness of 40 to 70, and preferably 45 to 68.

As in conventional golf balls, the golf ball of the invention has numerous dimples formed on the surface of the cover. The total number of dimples is preferably from 350 to 500, more preferably from 370 to 480, and most preferably from 390 to 450. The dimples may be distributed in a geometrical arrangement that is octahedral or icosahedral, for example. Nor is the dimple pattern limited to a circular pattern, the use of any other suitable pattern, such as a square, hexagonal, pentagonal or triangular pattern, also being acceptable.

The inventive golf ball may be formed so as to have a diameter and weight which are in accordance with the Rules of Golf; that is, a diameter not passing the ring with an inside diameter of 42.67 mm, preferably from 42.67 mm to 42.75 mm and a weight of not more than 45.93 grams, preferably 45.2 grams to 45.8 grams.

There has been described a golf ball offering pleasant feel when hit, improved durability, and increased distance.

EXAMPLES

Examples of the invention and comparative examples are given below by way of illustration, and are not intended to limit the invention.

Examples and Comparative Examples

Cores having the characteristics shown in Table 1 were produced by injection molding the resin-based compositions in Table 1 into a mold. It is noted that the core of Comparative Example 1 was produced by molding and vulcanizing the rubber composition formulated in Table 1.

Next, the core in each example (excluding Comparative Examples 1 and 2) was placed in an injection mold, and the resin-based compositions shown in Table 1 was injected into the mold cavity to form an enclosing layer around the core.

An intermediate layer was formed in each example by working the rubber composition shown in Table 1 with a roll mill, then subjecting the worked composition to primary vulcanization (semi-vulcanization) in a mold at 130° C. for 6 minutes to give a pair of hemispherical cups. The pair of hemispherical cups was closed as the intermediate layer over the core portion of the ball composed of the core and the enclosing layer, then subjected to secondary vulcanization (full vulcanization) in a mold at 155° C. for 15 minutes, giving a sphere of two or three layer structure.

A cover was then formed in each example by injection molding a material formulated as shown in Table 1 about the intermediate layer, yielding golf balls bearing dimples of the same shape, arrangement and number on the surface.

In Table 1, the Shore D hardness of the core is as measured according to ASTM D-2240, and the hardness values of the enclosing layer and the intermediate layer at the boundary were obtained in each case by cutting the ball in half and measuring the hardness at a given point on the cut face.

The resulting golf balls were evaluated for various properties. Using a swing robot, the ball was hit with a driver at a head speed of 40 m/s and the carry and total distance were measured.

Durability

Using a swing robot, the ball was successively hit 50 times with #1 wood. The initial velocity at which the ball launched was measured each time. The initial velocity drastically drops if rubber fissure occurs in the ball interior. The ball was rated "Poor" when a drop of initial velocity was found and "Good" when no drop was found until the last strike.

Feel

The feel of the golf ball when hit with a club was rated "Good" for an appropriate soft and solid feel, "Av" for an average feel, and "Hard" for a too hard feel.

The results are also shown in Table 1.

TABLE 1

|  |  |  | EX 1 | EX 2 | EX 3 | EX 4 | CE 1 | CE 2 | CE 3 |
|---|---|---|---|---|---|---|---|---|---|
| Core | Composition (pbw) | Hytrel 3046 (polyester) | 100 | 100 | 100 |  |  |  |  |
|  |  | Hytrel 4001 (polyester) |  |  |  | 100 |  |  |  |
|  |  | Rilsan BMNO (polyamide) |  |  |  |  |  | 100 | 100 |
|  |  | Barium sulfate | 5 | 5 | 5 |  |  | 45 | 45 |
|  |  | 1,4-cis-polybutadiene |  |  |  |  | 100 |  |  |
|  |  | Zinc oxide |  |  |  |  | 5 |  |  |
|  |  | Barium sulfate |  |  |  |  | 23 |  |  |
|  |  | Zinc diacrylate |  |  |  |  | 33 |  |  |
|  |  | Dicumyl peroxide |  |  |  |  | 1.2 |  |  |
|  | Parameters | Diameter (mm) | 8.0 | 10.0 | 12.0 | 15.0 | 30.0 | 25.0 | 10.0 |
|  |  | Weight (g) | 0.3 | 0.6 | 1.0 | 2.0 | 16.8 | 11.2 | 0.7 |
|  |  | Specific gravity | 1.12 | 1.12 | 1.12 | 1.12 | 1.19 | 1.36 | 1.36 |
|  |  | Shore D hardness | 30 | 30 | 30 | 40 | 58 | 60 | 80 |
| Enclosing layer | Composition (pbw) | Himilan 1706 (ionomer) |  |  |  |  |  |  | 50 |
|  |  | Himilan 1605 (ionomer) |  |  |  |  |  |  | 50 |
|  |  | Hytrel 4001 (polyester) | 100 |  | 100 |  |  |  |  |

TABLE 1-continued

|  |  |  | EX 1 | EX 2 | EX 3 | EX 4 | CE 1 | CE 2 | CE 3 |
|---|---|---|---|---|---|---|---|---|---|
|  |  | Pandex T7298 (polyurethane) |  | 100 |  | 100 |  |  |  |
|  |  | Barium sulfate |  |  |  |  |  |  | 40 |
|  | Parameters | Diameter inclusive of core (mm) | 13.0 | 15.0 | 17.0 | 19.0 |  |  | 30.0 |
|  |  | Thickness (mm) | 2.5 | 2.5 | 2.5 | 2.0 |  |  | 10.0 |
|  |  | Weight inclusive of core (g) | 1.3 | 2.1 | 2.9 | 4.2 |  |  | 18.1 |
| Intermediate layer | Composition (pbw) | 1,4-cis-polybutadiene | 100 | 100 | 100 | 100 | 100 | 100 | 100 |
|  |  | Zinc oxide | 5 | 5 | 5 | 5 | 5 | 5 | 5 |
|  |  | Barium sulfate | 27.0 | 21.0 | 28.0 | 21.0 | 16.0 | 21.0 | 5.0 |
|  |  | Zinc diacrylate | 16.0 | 30.0 | 16.0 | 30.0 | 33.0 | 5.0 | 29.0 |
|  |  | Dicumyl peroxide | 1.2 | 1.2 | 1.2 | 1.2 | 1.2 | 1.2 | 1.2 |
|  | Vulcanizing conditions | Primary vulcanization | 130° C./ 6 min | 130° C./ 6 min | 130° C./ 6 min | 130° C./ 6 min | 130° C./ 6 min | 130° C./ 6 min | 130° C./ 6 min |
|  |  | Secondary vulcanization | 155° C./ 15 min | 155° C./ 15 min | 155° C./ 15 min | 155° C./ 15 min | 155° C./ 15 min | 155° C./ 15 min | 155° C./ 15 min |
|  | Shape | Diameter (mm) | 38.5 | 38.5 | 38.5 | 38.5 | 38.5 | 38.5 | 38.5 |
|  |  | Thickness (mm) | 12.8 | 11.8 | 10.8 | 9.8 | 4.3 | 6.8 | 4.3 |
|  |  | Weight (g) | 35.0 | 35.0 | 35.0 | 35.0 | 35.0 | 35.0 | 35.0 |
|  |  | Specific gravity | 1.17 | 1.17 | 1.18 | 1.17 | 1.15 | 1.10 | 1.07 |
|  | Boundary hardness (Shore D) | Enclosing layer side | 41 | 51 | 40 | 50 | 57 | 80 | 63 |
|  |  | Intermediate layer side | 41 | 50 | 41 | 50 | 57 | 35 | 55 |
|  |  | Hardness difference between enclosing layer and intermediate layer | 0 | 1 | −1 | 0 | 0 | 45 | 8 |
|  |  | Hardness difference between core and intermediate layer* | 11 | 20 | 11 | 10 | −1 | −45 | −25 |
| Cover | Composition (pbw) | Himilan 1605 (ionomer) |  |  |  |  | 50 | 50 | 50 |
|  |  | Himilan 1706 (ionomer) |  |  |  |  | 50 | 50 | 50 |
|  |  | Himilan 1557 (ionomer) | 50 | 50 | 50 |  |  |  | 50 |
|  |  | Himilan 1601 (ionomer) | 50 | 50 | 50 |  |  |  | 50 |
|  | Parameter | Thickness (mm) | 2.1 | 2.1 | 2.1 | 2.1 | 2.1 | 2.1 | 2.1 |
| Ball | Parameters | Weight (g) | 45.3 | 45.3 | 45.3 | 45.3 | 45.3 | 45.3 | 45.3 |
|  |  | Diameter (mm) | 42.7 | 42.7 | 42.7 | 42.7 | 42.7 | 42.7 | 42.7 |
|  | HS = 40 m/s | Carry (m) | 193.0 | 194.5 | 193.5 | 194.0 | 193.4 | 192.0 | 190.0 |
|  |  | Total (m) | 211.0 | 210.5 | 209.5 | 210.0 | 209.3 | 207.5 | 204.0 |
|  |  | Feel | Good | Good | Good | Good | Hard | Av | Hard |
|  |  | Durability | Good | Good | Good | Good | Poor | Poor | Poor |

*difference between the hardness of the core and the hardness of the intermediate layer at the enclosing layer/intermediate layer boundary Japanese Patent Application No. 11-195816 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solid golf ball of multilayer structure comprising a core, an enclosing layer around the core, an intermediate layer around the enclosing layer, and a cover around the intermediate layer, wherein said core is comprised of a thermoplastic resin or thermoplastic elastomer as a base and has a diameter of 3 to 18 mm and a Shore D hardness of 15 to 50, said enclosing layer is comprised of a thermoplastic resin or thermoplastic elastomer as a base, and said enclosing layer and said intermediate layer have a substantially equal Shore D hardness at a boundary therebetween.

2. The golf ball of claim 1 wherein said intermediate layer is formed of a rubber composition comprising polybutadiene as a base.

3. The golf ball of claim 1 wherein the Shore D hardness of said core is lower than that of said intermediate layer.

4. The golf ball of claim 1 wherein said core has a specific gravity of at least 1.10.

* * * * *